US006551426B2

United States Patent
(12) United States Patent
Okuyama et al.

(10) Patent No.: US 6,551,426 B2
(45) Date of Patent: Apr. 22, 2003

(54) MANUFACTURING METHOD FOR A LAMINATED CERAMIC ELECTRONIC COMPONENT

(75) Inventors: Shingo Okuyama, Takefu (JP); Makoto Fukuda, Takefu (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 53 days.

(21) Appl. No.: 09/851,615

(22) Filed: May 9, 2001

(65) Prior Publication Data

US 2001/0054472 A1 Dec. 27, 2001

(30) Foreign Application Priority Data

May 9, 2000 (JP) .................................... 2000-136131

(51) Int. Cl.[7] ........................ B32B 31/26; H01F 41/00

(52) U.S. Cl. .............................. 156/89.12; 156/89.16; 156/235; 156/239; 156/246

(58) Field of Search .............................. 156/230, 235, 156/239, 246, 89.12, 89.14, 89.16; 29/851; 427/79, 80

(56) References Cited

U.S. PATENT DOCUMENTS

| | | | | |
|---|---|---|---|---|
| 5,101,319 A | * | 3/1992 | Diffeyes et al. | |
| 5,534,290 A | * | 7/1996 | Rainwater et al. | 427/97 |
| 5,865,920 A | * | 2/1999 | Sakuratani et al. | 156/89.16 |
| 5,935,358 A | * | 8/1999 | Yamasaki | 156/89.12 |
| 6,154,114 A | * | 11/2000 | Takahashi | |

FOREIGN PATENT DOCUMENTS

| | | | |
|---|---|---|---|
| JP | 6-61084 | * | 3/1994 |
| JP | 11-111551 | * | 4/1999 |

* cited by examiner

*Primary Examiner*—Curtis Mayes
(74) *Attorney, Agent, or Firm*—Keating & Bennett, LLP

(57) ABSTRACT

A manufacturing method for a laminated ceramic electronic component includes the steps of printing a layer of a conductor and a ceramic green sheet formed around the conductor a plurality of times on a carrier film, thus preparing a composite sheet laminate in which composite sheets made up of the conductor and the ceramic green sheet are laminated, and pressing and attaching the composite sheet laminate to another ceramic green sheet and removing the carrier film.

14 Claims, 7 Drawing Sheets

11
11
11
11
12
19
13
20
14
21
22
15
15
15
15

12
17
B
B
16

18
16 17
12
17 16
16 17
18
18

MANUFACTURING METHOD FOR A LAMINATED CERAMIC ELECTRONIC COMPONENT

BACKGROUND OF THE INVENTION

1. Field of the Invention

The present invention relates to a manufacturing method for a laminated ceramic electronic component such as a laminated inductor, and more particularly, the present invention relates to a manufacturing method for the laminated ceramic electronic component including a step of laminating a ceramic green sheet and a conductor supported by a carrier film using a transferring method.

2. Description of the Related Art

A laminated inductor using a sintered body that is obtained by integrally firing metals and ceramics is known. When the laminated inductor is manufactured, first, an internal electrode paste defining a coil conductor is printed on a ceramic green sheet. Then, a through-hole for electrically connecting the upper and lower internal electrodes is formed in the ceramic green sheet. A plurality of such green sheets is laminated and a laminate obtained in this way is pressed in the thickness direction. Next, by firing the laminate, a sintered ceramic body is obtained and a pair of external electrodes to be electrically connected to the coil conductor are formed on the external surface of the sintered ceramic body.

In the above laminated inductor, the number of turns is increased by increasing the number of laminated ceramic green sheets, and thus increased inductance is obtained.

However, in a method of printing an internal electrode paste defining a coil conductor on a ceramic green sheet, when the number of laminated ceramic green sheets increases, the difference in height between the portion where the internal electrode pastes exist and the portion where no internal electrode paste exists in the laminate increases. Because of this, when the laminate is pressed before firing, distortion occurs. Furthermore, because of the distortion, delamination between layers occurs after firing.

On the other hand, in the above-described laminated inductor, it is necessary to increase the thickness of the coil conductor or to increase the width of the coil conductor to reduce the direct-current resistance. However, in a method of forming internal electrodes, such as coil conductors, by printing an internal electrode paste on a ceramic green sheet, it is difficult to form a thick internal electrode in a single printing step.

Furthermore, even if a thick internal electrode is formed by repeating the printing of an internal electrode paste a plurality of times, when the laminate is pressed in the thickness direction, the above-mentioned distortion caused by pressure increases, and accordingly delamination between layers is more likely to occur in the obtained sintered ceramic body.

Furthermore, when the direct-current resistance is reduced by increasing the width of the coil conductor, the inductance becomes reduced.

The above-mentioned problems occur not only in laminated inductors, but also in laminated ceramic electronic components such as laminated ceramic capacitors. That is, when the number of laminated internal electrodes is increased, the distortion caused by pressure in the thickness direction increases as mentioned above, and delamination often occurs. Furthermore, when the thickness of an internal electrode is increased to lower the direct-current resistance, the above-mentioned delamination is much more likely to occur.

SUMMARY OF THE INVENTION

To overcome the above-described problems with the prior art, preferred embodiments of the present invention provide a manufacturing method for a laminated ceramic electronic component in which the thickness of an internal electrode is easily increased and, even if the number of laminated internal electrodes is increased, delamination does not occur.

Preferred embodiments of the present invention provide a manufacturing method for a laminated ceramic electronic component in which the thickness of a coil conductor as an internal electrode is easily increased and, even if the number of laminated internal electrodes is increased, delamination does not occur, and further, a greatly increased inductance is obtained.

According to a preferred embodiment of the present invention, a manufacturing method for a laminated ceramic electronic component, in which a laminate is obtained by laminating ceramic green sheets printed on a carrier film by a transferring method, a sintered body is obtained by firing the laminate, and external electrodes are formed on the external surface of the sintered body, includes the steps of printing the conductor and the ceramic green sheet provided around the conductor a plurality of times on the carrier film such that the conductors are provided one on top of another and the ceramic green sheets are provided one on top of another, thus forming a composite sheet laminate in which a plurality of composite sheets are laminated, each of the composite sheets including the conductor and the ceramic green sheet, and transferring the composite sheet laminate supported by the carrier film onto another ceramic green sheet by pressing and attaching the composite sheet laminate to the another ceramic green sheet and by removing the carrier film.

According to another preferred embodiment of the present invention, a manufacturing method for a laminated ceramic electronic component includes the steps of printing a conductor and a ceramic green sheet provided around the conductor a plurality of times on a first carrier film such that the conductors are provided one on top of another and the ceramic green sheets are provided one on top of another, thus forming a composite sheet laminate in which a plurality of composite sheets, each of which includes the conductor and the ceramic green sheet, are laminated, preparing a plurality of ceramic green sheet supports in which the ceramic green sheet is supported by a second carrier film, transferring the ceramic green sheets in the ceramic green sheet supports onto a laminating stage and removing the second carrier film, transferring at least one composite laminate by pressing and attaching the composite sheet laminate supported by the first carrier film to the ceramic green sheets on the laminating stage and by removing the first carrier film, pressing and attaching the ceramic green sheets in the ceramic green sheet supports to the composite sheet laminate transferred from the first carrier film and removing the second carrier film to obtain a laminate, firing the laminate to obtain a sintered ceramic body, and forming a plurality of external electrodes on the external surface of the sintered ceramic body.

Preferably, in the step of transferring the composite sheet laminate, the transferring of the composite sheet laminates is performed a plurality of times such that the conductors of the upper and lower composite sheet laminates are electrically connected.

Preferably, the conductors of the plurality of composite sheet laminates are constructed to form a coil inside the sintered ceramic body.

A manufacturing method for a laminated ceramic electronic component according to another preferred embodiment further includes the steps of forming connection electrode sheets including a connection electrode and a ceramic green sheet provided around the connection electrode, wherein when the plurality of composite sheet laminates are transferred, a plurality of the connection electrode sheets are transferred in the process of transferring a plurality of composite sheet laminates such that the conductors of the upper and lower composite sheet laminates are electrically connected by the connection electrode.

Preferably, the shape of the conductor in at least one of the composite sheet laminates is different from the shape of the conductors of the other composite sheet laminates.

It is also preferred that the transferring of the ceramic green sheet supported by a second carrier film is performed a plurality of times.

Preferably, when a ceramic green sheet is printed on the second carrier film to prepare the ceramic green sheet support, a plurality of the ceramic green sheet layers are printed.

Other features, elements, characteristics and advantages of the present invention will become more apparent from the following detailed description of preferred embodiments of the present invention with reference to the attached figures.

DETAILED DESCRIPTION OF PREFERRED EMBODIMENTS

Hereinafter, preferred embodiments of the present invention are described with reference to the drawings.

Figure 2A:
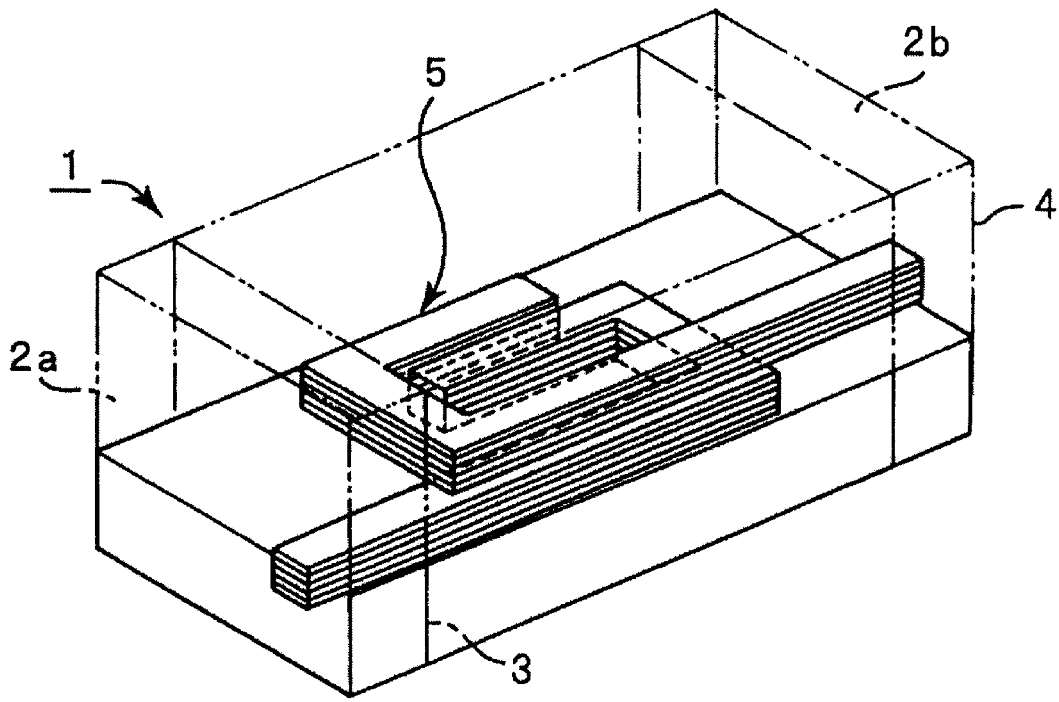
FIGS. 2A and 2B are a transparent schematic perspective view and a perspective view, respectively, showing a coil conductor, both of which illustrate the laminated inductor according to a first preferred embodiment of the present invention.
Figure 2B:
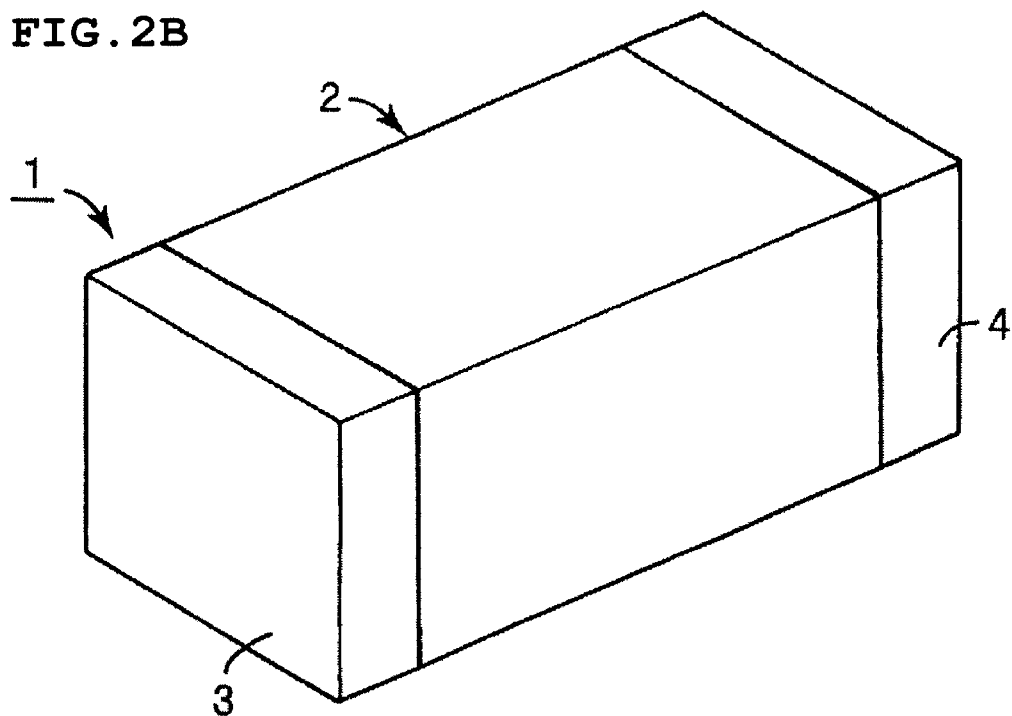

FIGS. 2A and 2B are a perspective view schematically showing the internal construction of a laminated inductor obtained according to a preferred embodiment of the present invention and an outer perspective view of the laminated inductor.

The laminated inductor 1 includes a substantially rectangular block of a sintered ceramic body 2. The sintered ceramic body 2 preferably includes magnetic ceramics such as ferrite, or insulating ceramics such as glass ceramics. Preferably, a magnetic ceramic is used.

First and second external electrodes 3 and 4 are formed to cover the first and second end surfaces 2*a* and 2*b* of the sintered ceramic body 2, respectively. Moreover, a coil conductor 5 is formed inside of the sintered ceramic body 2. As shown in FIG. 2A, one end of the coil conductor 5 is exposed at the end surface 2*a* and is electrically connected to the external electrode 3. Moreover, the other end of the coil conductor 5 is led out to the end surface 2*b* and is electrically connected to the external electrode 4.

Figures 1A, 1B, 1C:
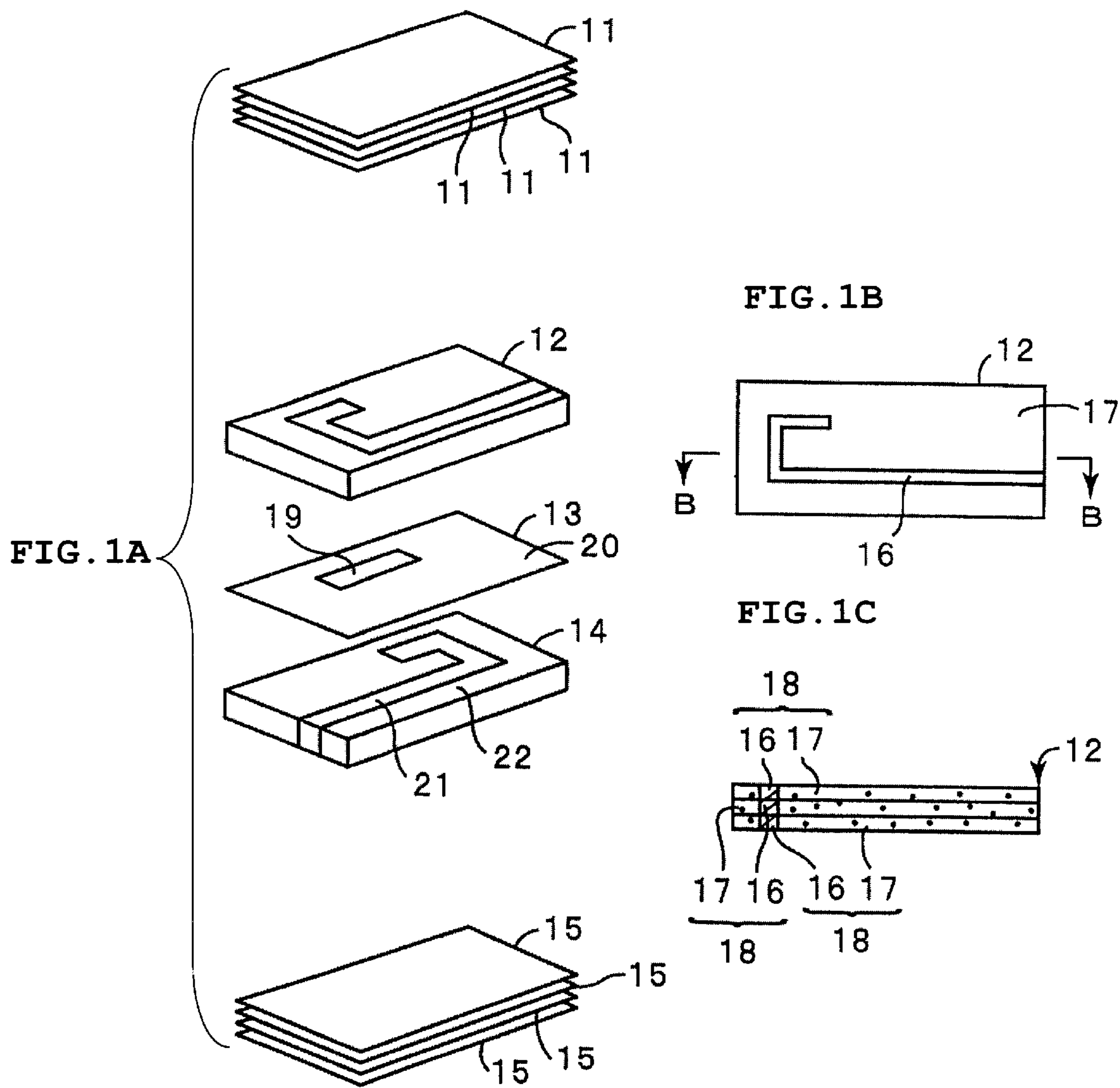
FIGS. 1A, 1B, and 1C are an exploded perspective view, a top view, and a sectional view taken on line B—B of FIG. 1B illustrating a ceramic green sheet, a composite sheet laminate, and an internal electrode paste layer to obtain a laminated inductor according to a first preferred embodiment of the present invention.

In the manufacture of the laminated inductor 1, green sheets 11, a composite sheet laminate 12, a connection electrode sheet 13, a composite sheet laminate 14, and green sheets 15 shown in FIG. 1A are laminated. Here, green sheets 11 and 15 define the uppermost and lowermost portions of the sintered ceramic body layers, respectively, and the other green sheets define the coil conductor 5.

As is shown in FIGS. 1B and 1C, the composite sheet laminate 12 includes a plurality of composite sheets 18 which are laminated. Each of the composite sheets 18 includes a first substantially U-shaped internal electrode paste layer 16 for forming an inductor which defines the coil conductor 5 and a ceramic green sheet layer 17 formed around the internal electrode paste layer 16. The internal electrode paste layer 16 is arranged to pass through from the upper surface to the lower surface of the ceramic green sheet layer 17.

In the present preferred embodiment, in a one-layer composite sheet 18, the composite sheet laminate 12, the internal electrode paste layer 16 and the ceramic green sheet 17 are preferably about 20 μm thick, and the internal electrode paste layer 16 is preferably about 100 μm wide. Accordingly, a plurality of layers of composite sheets 18 are laminated and a coil conductor portion with an aspect ratio that is close to one that includes a plurality of internal electrode paste layers 16.

The connection electrode sheet 13 includes a connection electrode paste layer 19 and a ceramic green sheet layer 20 disposed around the connection electrode paste layer 19. The connection electrode paste layer 19 has a short, substantially rectangular shape. Moreover, the connection electrode paste layer 19 is also arranged to pass through from the upper surface to the lower surface of the connection electrode sheet 13.

The composite sheet laminate 14 includes a plurality of composite sheet layers and each composite sheet contain an internal electrode paste layer 21 for forming inductor and a ceramic green sheet 22. The composite sheet laminate 14 is constructed in the same way as the composite sheet laminate 12.

Moreover, the connection electrode paste layer 19 electrically connects the coil conductor portion laminated above the layer 19, that is, the plurality of internal electrode paste layers 16 of the composite sheet laminate 12 and the coil conductor portion laminated below the layer 19, that is, the plurality of internal electrode paste layers 21 of the composite sheet laminate 14, to define an inductor.

Furthermore, the planar shape of the internal electrode paste layers 16 and 21 laminated in the composite sheet laminates 12 and 14 is the same and the internal electrode paste layer 21 is disposed in a direction such that the internal electrode paste layer 16 is rotated by about 180 degrees in the plane of the sheet. However, the planar shape of the internal electrode paste layers of the composite sheet laminates 12 and 14 disposed above and below the connection electrode may be different from each other.

Then, in each of the composite sheets defining the composite sheet laminates 12 and 14 and the connection electrode sheet 13, the internal electrode paste layers 16 and 21 and the connection electrode paste layer 19 are arranged to pass through from the upper surface to the lower surface. Therefore, such an effect cannot be achieved by a method in which a conductive paste is coated on ceramic green sheets. Accordingly, a method for forming the composite sheet laminate and the connection electrode sheet is described together with a method for forming the ceramic green sheets 11 and 15 with reference to FIGS. 3A, 3B, 4A, 4B, 4C, and 4D.

Figure 4A:
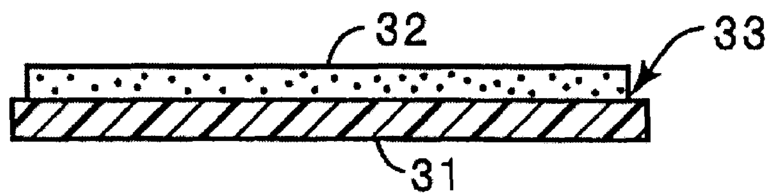
FIG. 4A is a sectional view showing a ceramic green sheet support in which a ceramic green sheet is formed on a mother carrier film.
Figure 4B:
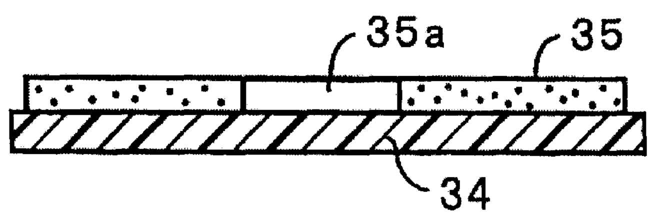
FIGS. 4B, 4C, and 4D are schematic sectional views showing each of the steps for forming a composite sheet laminate on the mother carrier film.
Figure 4C:
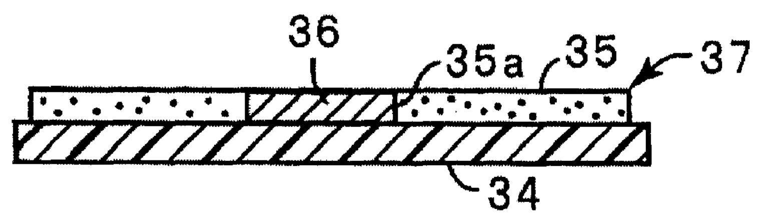
Figure 4D:
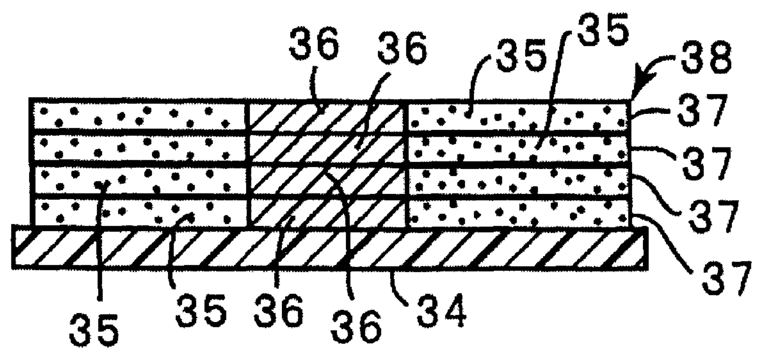

A mother ceramic green sheet support shown in FIG. 4A and a mother composite sheet laminate schematically shown in FIG. 4D are prepared.

Firstly, as shown in a schematic sectional view of FIG. 4A, a second mother carrier film 31 is prepared. The carrier film 31 is constructed by using a synthetic resin such as polyethylene telephthalate.

Figure 3A:
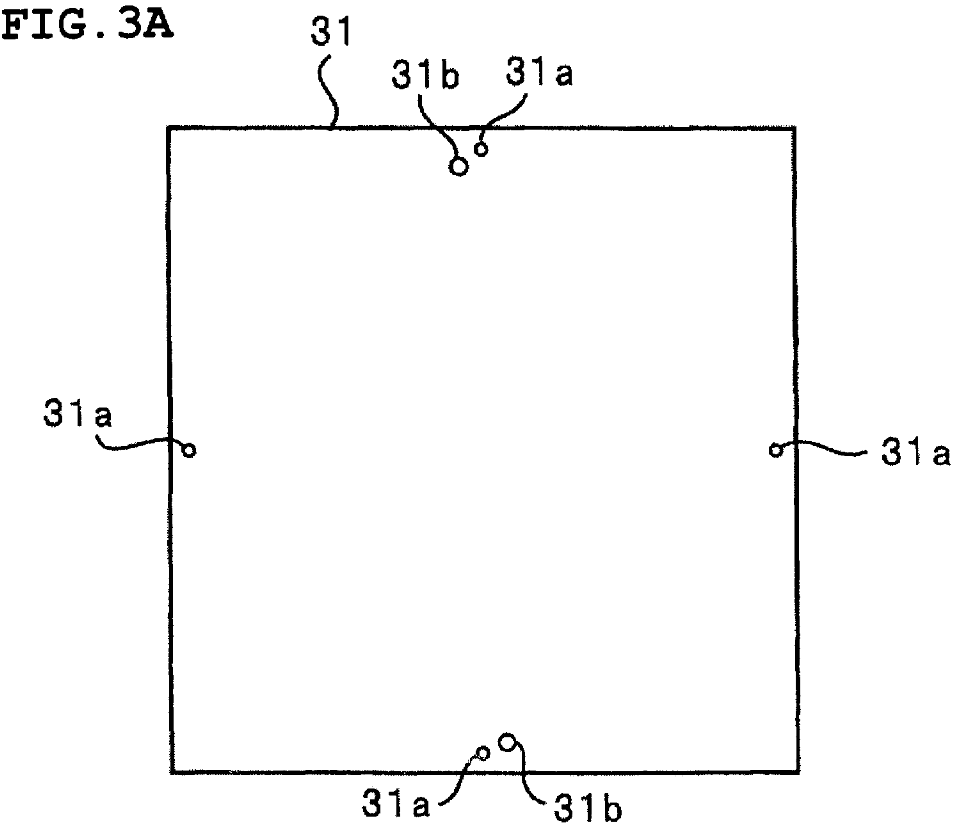
FIG. 3A is a top view showing a carrier film and FIG. 3B is a top view showing an internal electrode layer and a ceramic green sheet formed on the carrier film, both of which are used in the first preferred embodiment.

In the present preferred embodiment, the carrier film 31 preferably has a substantially square shape and a reference hole 31*a* for printing is provided in the middle of each side of the film (see FIG. 3A). Furthermore, a reference hole 31*b* for lamination is provided in the vicinity of the reference hole 31*a* for printing. A ceramic green sheet 32 is provided on the carrier film 31 while being positioned by the reference holes 31*a* for printing. In this way, a mother ceramic green sheet support member 33 shown in FIG. 4A is prepared. The ceramic green sheet 32 in this ceramic green sheet support member 33 is used to form the ceramic green sheets 11 and 15 defining the external layer portions shown in FIG. 1A.

Figure 3B:
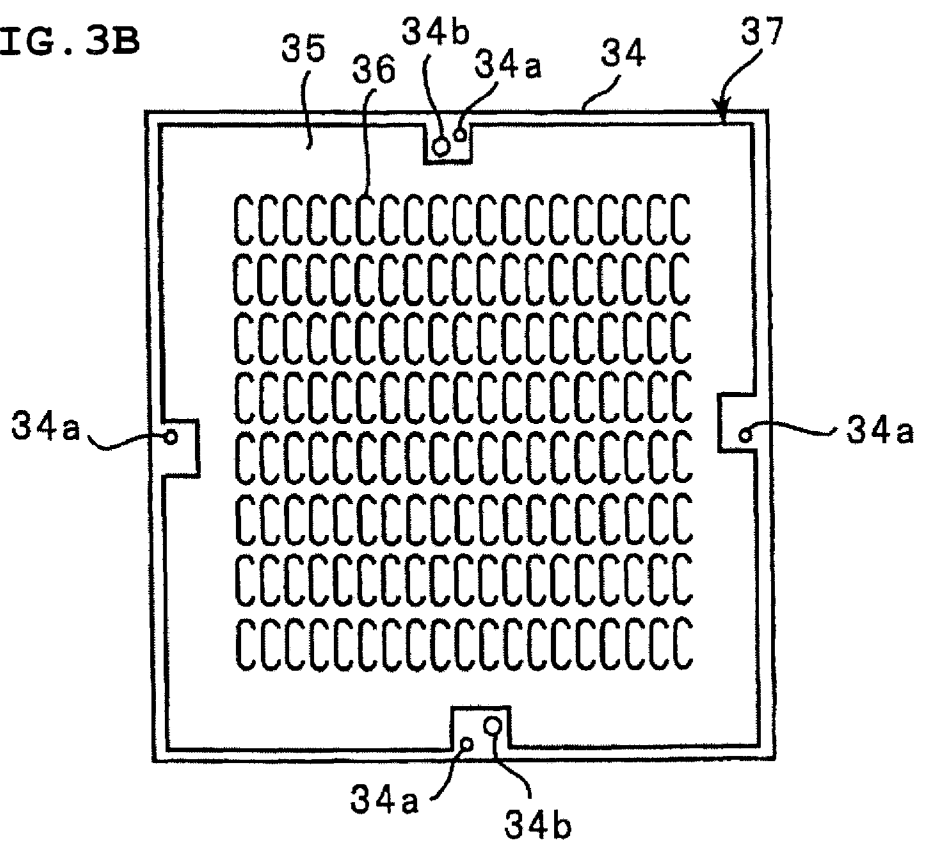

On the other hand, as shown in FIG. 3B, a first mother carrier film 34 is prepared. In the carrier film 34, reference holes 34*a* for printing are provided in the same way as in the carrier film 31 and a reference hole 34*b* for lamination is provided in the vicinity of the reference hole for printing. First, a ceramic green sheet 35 is printed on the first mother carrier film 34 by using the reference holes 34*a* for printing. As shown in a schematic sectional view of FIG. 4B, this ceramic green sheet 35 has a through-hole 35*a* in the portion corresponding to an area in which a conductor is formed. In FIG. 4B, only one through-hole 35*a* is illustrated, but many through-holes 35*a* are provided in the mother ceramic green sheet 35 so as to constitute a matrix.

Next, as shown in FIG. 4C, an internal electrode paste layer 36 defining a conductor is formed by printing a conductive paste inside the through-hole 35*a* after the through-hole 35*a* has been positioned using the reference holes for printing. Thus, a composite sheet 37 including the ceramic green sheet 35 and the internal electrode paste layer 36 is constructed on the carrier film 34.

Then, by repeating the step of forming the composite sheet 37 a plurality of times, a composite sheet laminate 38 is arranged on the first mother carrier film 34 as shown in FIG. 4D. According to a method for obtaining this composite sheet laminate 38, the above-mentioned composite sheet laminates 12 and 14 are formed.

Furthermore, the above-mentioned connection electrode sheet 13 are obtained in the same way by following the steps shown in FIGS. 4B and 4C.

Figure 5A:
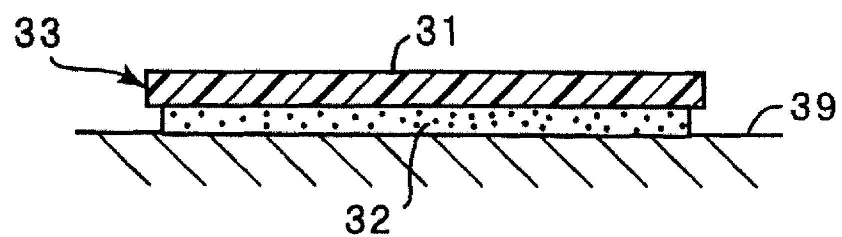
FIGS. 5A and 5B are schematic sectional views for describing a step of laminating ceramic green sheets in an external layer portion.
Figure 5B:
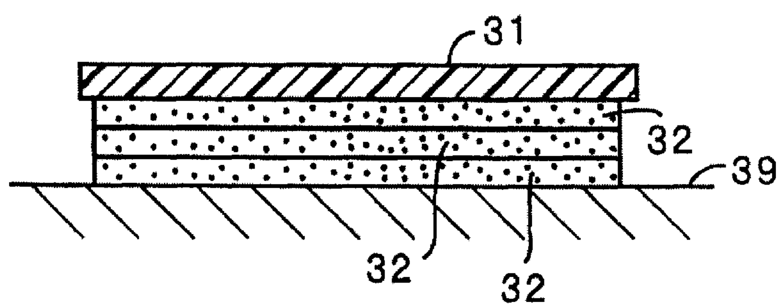

In the lamination, as shown in a schematic sectional view of FIG. 5A, the side of the ceramic green sheet 32 of a ceramic green sheet support member 33 is pressed and attached to the laminating stage 39. After that, the second mother carrier film 31 is removed. By repeating this step, as shown in FIG. 5B, a plurality of ceramic green sheets 32 are laminated. This portion corresponds to the portion in which the ceramic green sheets are laminated in the lower composite sheet laminate 14 shown in FIG. 1A.

Moreover, instead of the above ceramic green sheet 32, a ceramic green sheet that is produced by any other suitable method and not supported by a carrier film may be used.

Figure 6:
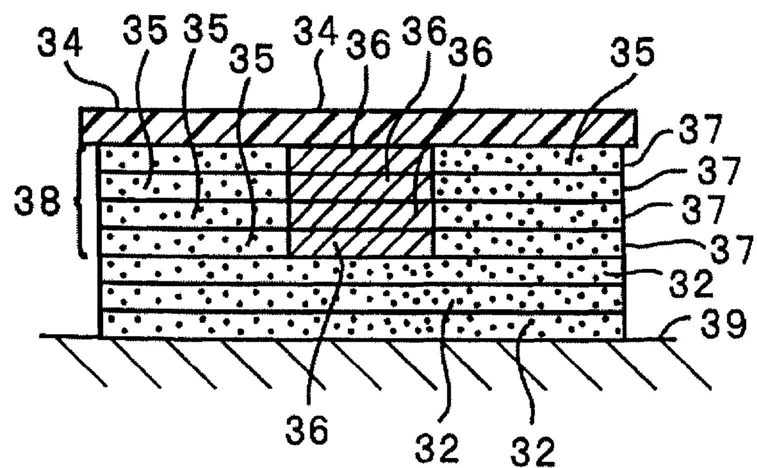
FIG. 6 is a schematic sectional view illustrating a step of laminating a composite sheet laminate onto a ceramic green sheet on a laminating stage by a transferring method.

Next, as shown in FIG. 6, a composite sheet laminate 38 shown in FIG. 4D is pressed and attached to the mother ceramic green sheet 32 and the first mother carrier film 34 is removed. In this way, the mother composite sheet laminate corresponding to the composite sheet laminate 14 shown in FIG. 1A is laminated on the ceramic green sheet 32 in one transferring step. In the same way, a mother connection electrode sheet for constructing the connection electrode sheet 13 is laminated on the composite sheet laminate 38 by a transferring method. Further, a mother composite sheet laminate corresponding to a composite sheet laminate 12 as shown in FIG. 1A is laminated by a transferring method. A step of laminating a ceramic green sheet 32 supported by a second mother carrier film 31 as shown in FIG. 4A by a transferring method is further repeated a plurality of times, and thus a laminate is obtained.

Moreover, here, instead of the ceramic green sheet 32, a ceramic green sheet which is not supported by a carrier film may be used.

The laminate is cut into individual chips and they are sintered, and then a sintered ceramic body 2 shown in FIG. 2A is obtained. Then, external electrodes 3 and 4 are preferably formed by firing a conductive paste on the end surfaces 2*a* and 2*b* of the sintered ceramic body 2. As described above, a laminated inductor 1 of the present preferred embodiment is produced.

According to the manufacturing method of the present preferred embodiment, because the internal electrode paste layers 16 and 21 and the connection electrode paste layer 19 defining the composite sheets are arranged to pass through from the upper surface to the lower surface of the ceramic green sheet layers 17, 21, and 20, the internal electrode paste layers 16 and 21 and the connection electrode paste layer 19 have an increased thickness. In addition, in each of the internal electrode paste layers 16 and 21 defining the coil conductors, a plurality of layers are laminated, and accordingly it is possible to construct a very thick coil conductor portion.

Therefore, it is possible to obtain a large inductance and current-carrying capacity and lower the direct-current resistance.

Furthermore, in the present preferred embodiment, as a plurality of composite sheets 37 are laminated on a first mother carrier film 34 in advance, the number of times that the transferring is performed in the lamination to construct a coil conductor is decreased and the laminating process step is simplified. In addition, as the number of times the transferring is performed is reduced, the number of the carrier film used is reduced.

Figure 7:
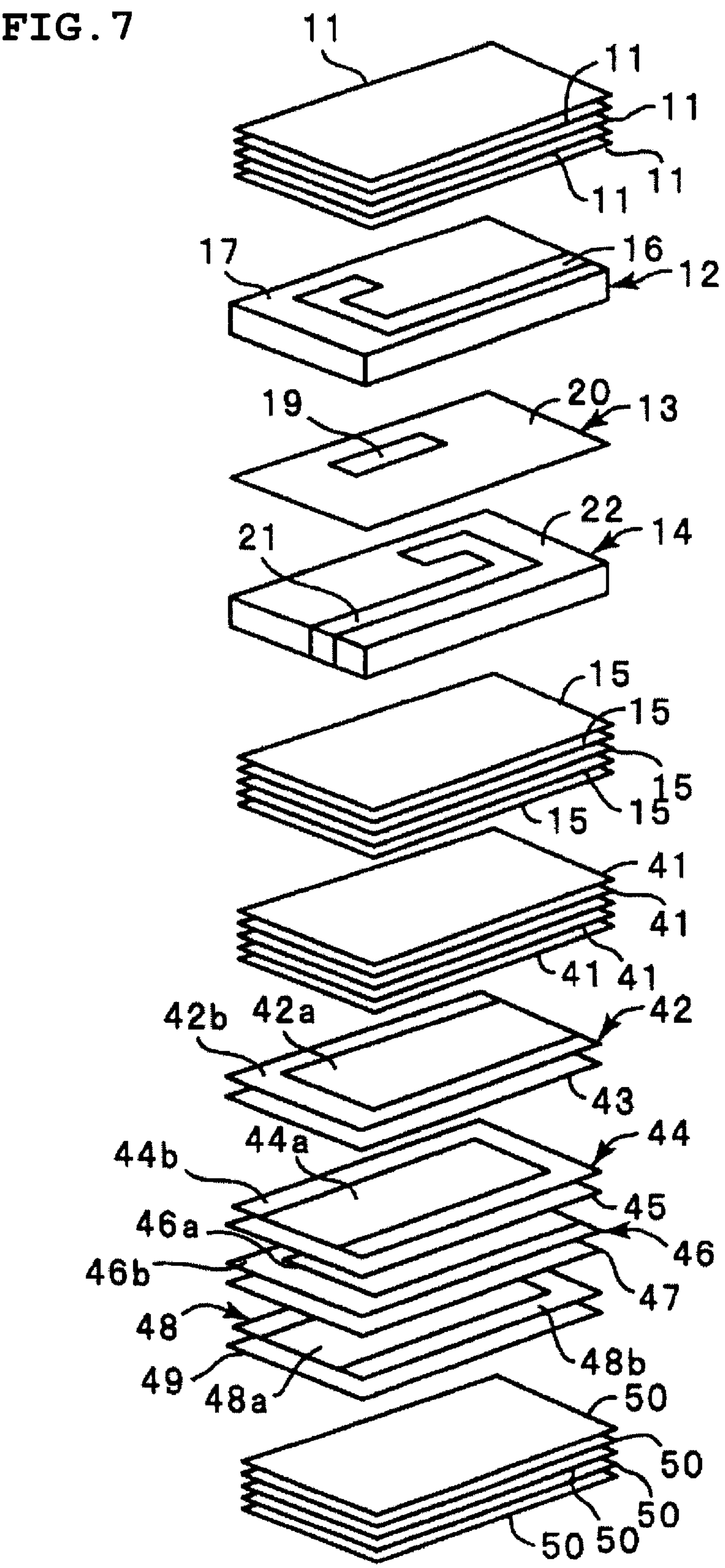
FIG. 7 is an exploded perspective view illustrating a green sheet, a conductor, and a composite sheet to obtain a laminated-type LC component according to a second preferred embodiment of the present invention.

FIG. 7 is an exploded perspective view for describing a manufacturing method for a laminated ceramic electronic component according to a second preferred embodiment of the present invention. In the present preferred embodiment, a plurality of sheets for defining a capacitor are laminated on the lower portion of a laminated inductor according to the first preferred embodiment. That is, to construct a capacitor portion, ceramic green sheets 41, a composite sheet 42, a ceramic green sheet 43, a composite sheet 44, a ceramic green sheet 45, a ceramic green sheet 47, a composite sheet 48, and ceramic green sheets 49 and 50 are laminated.

The ceramic green sheets 41 and 50 are laminated to define the external ceramic portion of the capacitor portion. The composite sheets 42, 44, 46, and 48 contain substantially rectangular internal electrode paste layers 42*a*, 44*a*, 46*a*, and 48*a* to lead the capacitive loads out, and ceramic green sheet layers 42*b*, 44*b*, 46*b*, and 48*b* formed around the internal electrode paste layers.

The composite sheets 42, 44, 46, and 48 are obtained in the same manner as the composite sheets constructed in the inductor portion described above, and the internal electrode paste layers 42*a*, 44*a*, 46*a*, and 48*a* are arranged to pass through from the upper surface to the lower surface of the composite sheets 42, 44, 46, and 48. Therefore, as the internal electrode paste layers 42*a*, 44*a*, 46*a*, and 48*a* are thick, a capacitor having a large current-carrying capacity is produced.

Furthermore, as the internal electrode paste layers 42*a*, 44*a*, 46*a*, and 48*a* are formed to pass through from the upper surface to the lower surface of the composite sheets 42, 44, 46, and 48, the ceramic green sheets 43, 45, and 47 are inserted to prevent short-circuiting between the upper and lower internal electrode paste layers.

According to the present preferred embodiment, a laminate obtained by laminating each sheet shown in FIG. 7 is baked and external electrodes are formed on both end surfaces, and thus a laminated-type LC component in which a laminated inductor and a laminated capacitor are integrated is provided.

Figure 8:
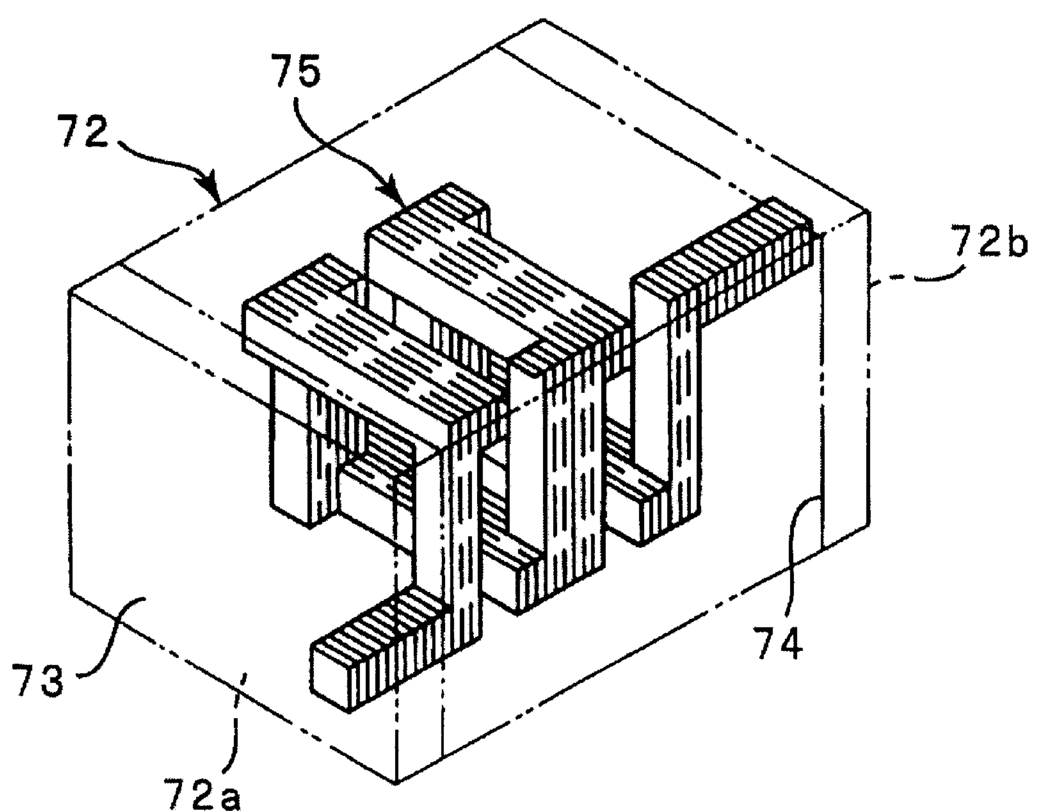
FIG. 8 is a schematic perspective view for describing a modified example of the laminated inductor of a first preferred embodiment.

Moreover, in the first preferred embodiment, the external electrodes 3 and 4 are formed on the end surfaces 2*a* and 2*b* of the sintered ceramic body 2 and the coil conductor 5 is wound in the direction from the upper surface 2*c* to the lower surface 2*c*, but, as shown in FIG. 8, external electrodes 73 and 74 are formed on the end surfaces 72*a* and 73*a* of a sintered ceramic body 72 and a laminated inductor 71 in which a coil conductor 75 is wound in the direction from the end surface 72*a* to the end surface 72*b*, that is, the laminated inductor 71 of a lateral winding type is constructed. In the case of the lateral winding type, the sintered ceramic body 72 is obtained by firing a laminate in which ceramic green sheets are laminated in the direction from the end surface 72*a* to the end surface 72*b* of the sintered ceramic body 72, and, in this case, the upper and lower sides in the present invention are determined in reference to the direction of lamination.

That is, in the lamination, the sheets are laminated starting with the lower ceramic green sheets to the upper composite sheets and ceramic green sheets in sequence and, as shown in FIG. 8, the outermost side surfaces in the direction of lamination define the end surfaces 72*a* and 72*b*.

Moreover, in the first and second preferred embodiments and modified example, the manufacturing methods for the laminated inductors and laminated-type LC component were described, but the present invention can be applied to manufacturing methods for other laminated ceramic electronic components such as laminated varistors, laminated thermistors, laminated capacitors, multilayer ceramic substrates, laminated modules, and other suitable laminated ceramic electronic components.

In the manufacturing method for a laminated ceramic electronic component according to the first preferred embodiment of the present invention, a composite sheet laminate is formed by laminating a conductor and a ceramic green sheet provided around the conductor on a carrier film a plurality of times, the composite sheet laminate supported by the carrier film is transferred on another ceramic green sheet by a transferring method, and thus a laminate is obtained. Accordingly, as the conductor in composite sheets is thick and the composite sheets are laminated, a plurality of conductor layers are laminated and it is possible to make the thickness of the internal electrode very large and, as a result, it is possible to increase the inductance and current-carrying capacity and decrease the direct-current resistance.

Furthermore, as a plurality of composite sheets are laminated on the carrier film in advance, the number of times the transferring is performed is substantially decreased and accordingly, the productivity of laminated ceramic electronic components is greatly improved.

In the manufacturing method for a laminated ceramic electronic component according to the second preferred embodiment of the present invention, by following at least a step of transferring a ceramic green sheet of a ceramic green sheet support on the laminating stage and removing a second carrier film, at least one ceramic green sheet is laminated, a step in which a composite sheet laminate supported by a first carrier film is transferred on the ceramic green sheet is provided, and thus a laminate is obtained. Accordingly, as a conductor is arranged to pass through a ceramic green sheet in the same way as in the first preferred embodiment of the invention, the conductor in the composite sheet has an increased thickness, and furthermore, because a plurality of composite sheets are laminated, a very thick internal electrode is produced. Consequently, the inductance and current-carrying capacity is greatly increased and furthermore the direct-current resistance is greatly reduced.

Furthermore, as a composite sheet laminate is transferred while the laminate is supported on a second carrier film, the number of times the transferring is performed is decreased, and, because of that, the laminating step is simplified and at the same time the usage of the carrier film is reduced.

In the above step of transferring a composite laminate, when the transfer is performed a plurality of times such that a plurality of upper and lower conductors are electrically connected, various conductors such as coils, can be constructed inside a sintered ceramic body by choosing the pattern of the conductors of the upper and lower composite sheet laminates. In particular, when the conductors in the plurality of composite laminates are constructed such that a coil is constructed inside the sintered ceramic body, according to various preferred embodiments of the present invention, a laminated inductor having a large inductance and a small resistance is easily obtained. When a composite sheet laminate including a plurality of layers is transferred, if a plurality of connection electrode sheets are transferred such that the conductors of the upper and lower composite sheet laminates are electrically connected to each other in the transferring step of transferring the composite sheet laminate, the conductors in the upper and lower composite sheet laminates are electrically connected by the connection electrode and accordingly a coil conductor is easily formed by choosing the pattern of the upper and lower conductors.

When at least the conductor pattern of a composite sheet laminate is different from the conductors of the other composite sheet laminates, internal conductors having various patterns such as a coil are easily formed by a combination of conductor patterns.

When the step of transferring a ceramic green sheet supported by a second carrier film is performed a plurality of times, the thickness of ceramic layers to be constructed by laminating plain ceramic green sheets is greatly increased, and accordingly, for example, the ceramic portions outside a laminated ceramic electronic component are easily constructed in the direction of lamination.

Furthermore, in this case, when a ceramic green sheet is printed on a second carrier film to prepare a ceramic green sheet support, if a plurality of ceramic green sheets are printed, a plurality of ceramic green sheets are efficiently and easily laminated by one transferring process step while the plurality of ceramic green sheets are supported on the carrier film.

While the present invention has been described with reference to what is presently considered to be the preferred embodiment, it is to be understood that the invention is not limited to the disclosed preferred embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A manufacturing method for a laminated ceramic electronic component, in which a laminate is obtained by laminating ceramic green sheets printed on a carrier film by a transferring method, a sintered body is obtained by firing the laminate, and external electrodes are formed on the external surface of the sintered body, the method comprising the steps of:

printing a conductor and a ceramic green sheet provided around the conductor a plurality of times on a carrier film such that the conductors are provided one on top of another and the ceramic green sheets are provided one on top of another, thus forming a composite sheet laminate in which a plurality of composite sheets are laminated, each of the composite sheets including the conductor and the ceramic green sheet; and transferring the composite sheet laminate supported by the carrier film onto another ceramic green sheet by pressing and attaching the composite sheet laminate to said another ceramic green sheet and by removing the carrier film.

2. A manufacturing method for a laminated ceramic electronic component, comprising the steps of:

printing a conductor and a ceramic green sheet provided around the conductor a plurality of times on a first carrier film such that the conductors are provided one on top of another and the ceramic green sheets are provided one on top of another, thus forming a composite sheet laminate in which a plurality of composite sheets, each of which includes the conductor and the ceramic green sheet, are laminated;

preparing a plurality of ceramic green sheet supports in which a ceramic green sheet is supported by a second carrier film;

transferring the ceramic green sheets in the ceramic green sheet supports onto a laminating stage and removing the second carrier film;

transferring at least one composite laminate by pressing and attaching the composite sheet laminate supported by the first carrier film to the ceramic green sheets on the laminating stage and by removing the first carrier film;

pressing and attaching the ceramic green sheets in the ceramic green sheet supports to the composite sheet laminate transferred from the first carrier film and removing the second carrier film to obtain a laminate;

firing the laminate to obtain a sintered ceramic body; and forming a plurality of external electrodes on the external surface of the sintered ceramic body.

3. A manufacturing method for a laminated ceramic electronic component as claimed in claim 2, wherein in the step of transferring the composite sheet laminate, the transferring of the composite sheet laminates is performed a plurality of times such that the conductors of upper and lower composite sheet laminates are electrically connected.

4. A manufacturing method for a laminated ceramic electronic component as claimed in claim 3, wherein the conductors of the plurality of composite sheet laminates are constructed so as to form a coil inside the sintered ceramic body.

5. A manufacturing method for a laminated ceramic electronic component as claimed in claim 3, further comprising the step of forming connection electrode sheets including a connection electrode and a ceramic green sheet provided around the connection electrode, wherein when the plurality of the composite sheet laminates are transferred, a plurality of the connection electrode sheets are transferred in process of transferring the plurality of the composite sheet laminates such that the conductors of the upper and lower composite sheet laminates are electrically connected by the connection electrode.

6. A manufacturing method for a laminated ceramic electronic component as claimed in claim 3, wherein the shape of the conductor in at least one of the composite sheet laminates is different from the shape of the conductors of the other composite sheet laminates.

7. A manufacturing method for a laminated ceramic electronic component as claimed in claim 2, wherein the transferring of the ceramic green sheet supported by a second carrier film is performed a plurality of times.

8. A manufacturing method for a laminated ceramic electronic component as claimed in claim 2, wherein when a ceramic green sheet is printed on the second carrier film to prepare the ceramic green sheet support, a plurality of the ceramic green sheet layers are printed.

9. A manufacturing method for a laminated ceramic electronic component as claimed in claim 2, wherein the step of printing a conductor and a ceramic green sheet is performed such that the conductor passes through from an upper surface to a lower surface of the ceramic green sheets.

10. A manufacturing method for a laminated ceramic electronic component as claimed in claim 2, wherein said second carrier film is formed of synthetic resin.

11. A manufacturing method for a laminated ceramic electronic component as claimed in claim 2, wherein said second carrier film is formed to have a substantially square shape and a reference hole for printing is provided in the middle of each side of said second carrier film.

12. A manufacturing method for a laminated ceramic electronic component as claimed in claim 11, wherein said first carrier film includes a reference hole which corresponds to the reference hole provided in said second carrier film.

13. A manufacturing method for a laminated ceramic electronic component as claimed in claim 2, wherein said ceramic green sheets are provided with through-holes, and said step of printing said conductor is performed using electrode paste.

14. A manufacturing method for a laminated ceramic electronic component as claimed in claim 2, wherein said conductor and said ceramic green sheet are printed to be about 20 $\mu$m thick.

* * * * *